United States Patent [19]
Orbits et al.

[11] Patent Number: 5,630,097
[45] Date of Patent: May 13, 1997

[54] ENHANCED CACHE OPERATION WITH REMAPPING OF PAGES FOR OPTIMIZING DATA RELOCATION FROM ADDRESSES CAUSING CACHE MISSES

[75] Inventors: David A. Orbits, Redmond; Kenneth D. Abramson, Seattle; H. Bruce Butts, Jr., Redmond, all of Wash.

[73] Assignee: Digital Equipment Corporation, Maynard, Mass.

[21] Appl. No.: 178,487

[22] Filed: Jan. 7, 1994

Related U.S. Application Data

[63] Continuation of Ser. No. 716,207, Jun. 17, 1991, abandoned.
[51] Int. Cl.⁶ .................................................. G06F 12/02
[52] U.S. Cl. .................... 395/492; 395/500; 395/60; 395/853; 395/460; 395/457; 364/DIG. 1
[58] Field of Search ............................. 395/400, 425, 395/700 MS, 500, 60, 853, 460, 475, 492; 364/551.01

[56] References Cited

U.S. PATENT DOCUMENTS

| | | | |
|---|---|---|---|
| 4,415,970 | 11/1983 | Swenson et al. | 395/457 |
| 4,489,378 | 12/1984 | Dixon et al. | 395/853 |
| 4,849,879 | 7/1989 | Chinnaswamy et al. | 395/60 |
| 4,947,319 | 8/1990 | Bozman | 395/700 |
| 4,989,134 | 1/1991 | Shaw | 395/600 |
| 5,043,885 | 8/1991 | Robinson | 395/460 |
| 5,062,055 | 10/1991 | Chinnaswamy et al. | 364/551.01 |
| 5,088,036 | 2/1992 | Ellis et al. | 395/600 |
| 5,133,058 | 7/1992 | Jensen | 395/417 |
| 5,193,191 | 3/1993 | McKeeman et al. | 395/700 |
| 5,247,653 | 9/1993 | Hung | 395/500 |

OTHER PUBLICATIONS

Patterson et al, "Computer Architecture—A Quantitative Approach", Morgan Kaufmann Publishers, Inc., 1990, pp. 419–424, 441–444, 454–474.

Hamacher et al, "Computer Organization", McGraw-Hill, 1984, pp. 307–313.

Smith, "Cache Memory Design: An Evolving Art", IEEE Spectrum, Dec. 1987, pp. 40–44.

Primary Examiner—Tod R. Swann
Assistant Examiner—J. Peikari
Attorney, Agent, or Firm—Denis G. Maloney; Arthur W. Fisher

[57] ABSTRACT

A computer system executing virtual memory management and having a cache is operated in a manner to reduce cache misses by remapping pages of physical memory from which cache misses are detected. The method includes detecting cache misses, as by observing cache fill operations on the system bus, and then remapping the pages in the main memory which contain the addresses of the most frequent cache misses, so that memory references causing thrashing can then coexist in different pages of the cache. For a CPU executing a virtual memory operating system, a page of data or instructions can be moved to a different physical page frame but remain at the same virtual address, by simply updating the page-mapping tables to reflect the new physical location of the page, and copying the data from the old page frame to the new one. The primary feature of the invention is to add bus activity sampling logic to the CPU and enhance the operating system to allow the operating system to detect when cache thrashing is occurring and remap data pages to new physical memory locations to eliminate the cache thrashing situation.

18 Claims, 5 Drawing Sheets

ENHANCED CACHE OPERATION WITH REMAPPING OF PAGES FOR OPTIMIZING DATA RELOCATION FROM ADDRESSES CAUSING CACHE MISSES

This application is a continuation of application Ser. No. 07/716,207 filed Jun. 17, 1991, now abandoned.

RELATED CASE

This application discloses subject matter also disclosed in copending application now U.S. Pat. No. 5,442,571, filed herewith, by Richard L. Sites, entitled "METHOD AND APPARATUS FOR CACHE MISS REDUCTION BY SIMULATING CACHE ASSOCIATIVITY" and assigned to Digital Equipment Corporation, the assignee of this invention.

BACKGROUND OF THE INVENTION

This invention relates to computer operation, and more particularly to a method of reducing the cache miss rate in a computer system using virtual memory management.

The performance of CPUs has far outstripped memory system performance in the development of computer hardware technology. Caches, which are small, fast memories a fraction of the size of main memory, are used to decrease the effective memory access times. A cache stores a copy of recently-used data for rapid access should the data be needed again, and, for many programs, a cache greatly improves the processing speed of the computer system. However, some programs exhibit poorer than expected performance, or run-to-run performance variations due to a phenomena termed "cache thrashing."

The simplest and fastest (and hence most popular) caches severely limit the number of cache locations where a particular data item can reside. For example, a direct-mapped cache has only one location where a data item may be stored. Cache thrashing occurs when two or more heavily used data items map to the same cache location, and these data items are used by a program in a cyclic manner, as in a loop. As each data is used, it displaces its predecessor, causing a relatively slow main memory access. Cache thrashing can severely degrade program run times by forcing many main memory accesses, and thrashing also increases the system interconnect bandwidth required by a system to obtain reasonable performance.

Cache thrashing occurs on a chance basis when the operating system randomly assigns data items to physical memory pages. The data items in this context may be operating system code or data structures, or the code or data of any of the programs the operating system is managing.

In the past, general-purpose operating systems such as UNIX or VMS have made no effort to assign physical memory pages in other than "random" order. This pseudo-random order of physical memory assignments is obtained incidentally via the complex process of virtual memory management and its re-ordering of physical memory pages on a free page list.

The process of assigning virtual memory pages to physical memory pages also defines the subset of CPU cache locations where this data can reside, as cache locations are selected as a function of physical page address, using a cache tag which is part of the physical address. Current operating systems have no mechanism for favoring the selection of one physical page over another to reduce the likelihood of cache thrashing, and no mechanism to detect if a group of physical pages are cache thrashing and remap one or more of the thrashing pages to new physical pages to alleviate the problem.

The random assignment of virtual to physical memory pages is very likely to produce a mapping with several cache locations that have one or more physical pages mapped to them. This problem becomes particularly acute in direct-mapped caches, in which each page can only reside in a single cache location. This physical page selection process can be closely modeled as a "random selection with replacement" probability problem. For example, a 256-entry cache 25% filled has on the average six cache locations with two or more physical pages mapped to them. In this scenario, a very few physical memory pages can be expected to result in an inequitably large percentage of the cache misses. In other words, the cache is being utilized in very inefficient manner.

SUMMARY OF THE INVENTION

In accordance with one embodiment of the invention, a computer system executing virtual memory management and having a cache is operated in a manner to reduce cache misses by remapping pages of physical memory from which cache misses are detected. In a CPU executing a virtual memory type of operating system, data is handled in pages and the cache is accessed via physical addresses. The method includes detecting cache misses, as by observing cache fill operations on the system bus, and then remapping the pages in the main memory which contain the addresses of the most frequent cache misses, so that memory references causing thrashing can then coexist in different pages of the cache. Two memory addresses which are in different physical page frames but which map to the same location in the cache may be arbitrarily placed in the direct-mapped cache at the same cache page; alternate reference to these two addresses by a task executing on the CPU would cause thrashing. However, if the location of one of these addresses in main memory is changed, the data items having these addresses can then coexist in the cache, and performance will be markedly improved because thrashing will no longer result. For a CPU executing a virtual memory operating system, a page of data or instructions can be moved to a different physical page frame but remain at the same virtual address. This is accomplished by simply updating the page-mapping tables to reflect the new physical location of the page, and copying the data from the old page frame to the new one. In brief, the primary feature of the invention is to add bus activity sampling logic to the CPU and enhance the operating system to allow the operating system to detect when cache thrashing is occurring and remap data pages to new physical memory locations to eliminate the cache thrashing situation.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 5 is an electrical diagram in block form of cache miss monitoring circuitry used in the system of FIG. 1 according to one embodiment of the invention;

FIG. 6 is a diagram of a data array structure used in implementing the method of the invention;

DETAILED DESCRIPTION OF SPECIFIC EMBODIMENTS

Figure 1:
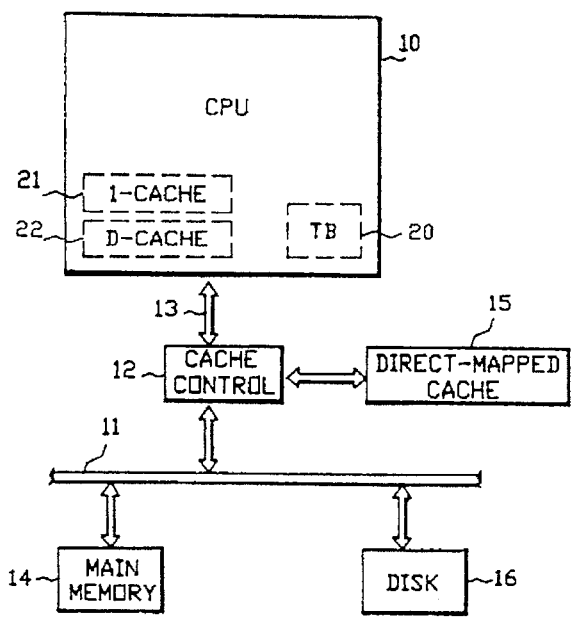
FIG. 1 is an electrical diagram in block form of a computer system which may employ the features of one embodiment of the invention.

Referring to FIG. 1, a computer system is illustrated which may employ the cache-miss reduction method of the invention. A CPU 10 is coupled to a system bus 11 through a cache controller 12 and a CPU bus 13. A main memory 14 is connected to and accessed by the system bus 11, and a cache memory 15 is connected to the cache controller 12 so it is accessed directly by the CPU bus 13. The CPU 10 implements a virtual memory management system such as that provided by the UNIX™ or VAX/VMS™ operating systems, and so a virtual-to-physical address translation is made when memory references are executed, pages of data are swapped between physical memory provided by the main memory 14 and secondary storage in the form of a disk 16. The VAX architecture is described by Levy and Eelshouse in "Computer Programming and Architecture: The VAX", 2nd Ed., Digital Press, 1989, which is incorporated herein by reference. The CPU 10 may be of the VAX™ type as disclosed by in the Levy et al text or in U.S. Pat. No. 5,006,980, issued to Sander, Uhler & Brown, assigned to Digital Equipment Corporation, the assignee of this invention, or preferably may be of an advanced 64-bit RISC type as disclosed in copending application Ser. No. 547,630, filed Jun. 29, 1990, also assigned to Digital Equipment Corporation. Of course the CPU 10 may be of any one of a number of other types of construction capable of executing a virtual memory management system. Also, it should be noted that the method to be described may also operate in a multiprocessor environment, in which a number of CPUs 10 connected to a common system interconnect 11 would each have a separate cache 15; each of these CPUs would execute the cache management method described below.

Figure 2:
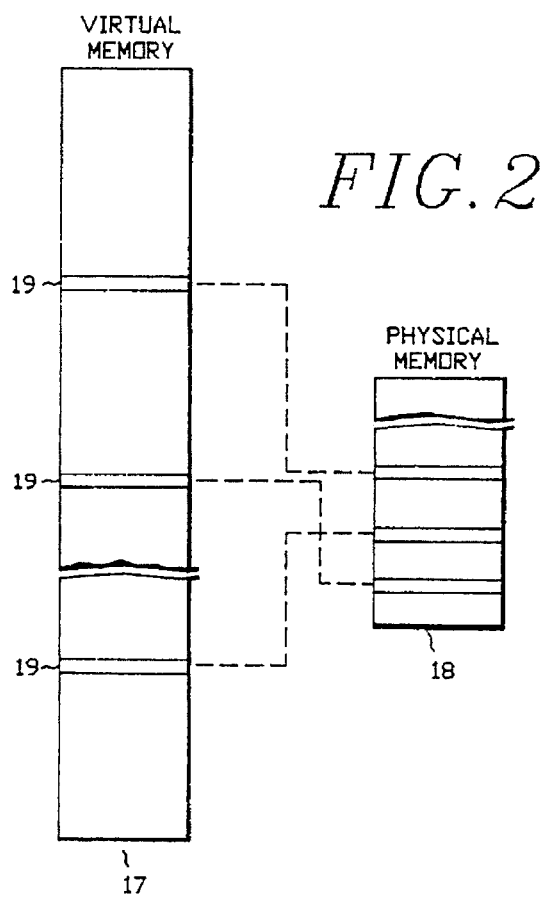
FIG. 2 is a diagram of memory mapping for a virtual memory scheme which may be used in the system of FIG. 1.

The CPU 10 generates memory references by first forming a virtual address, representing the address within the entire address range 17 as seen in FIG. 2, defined by the architectural specifications of the computer or that portion of it allowed by the operating system, then translating the virtual address to a physical memory 18 constrained by the size of the main memory 14. The translation is done by pages, so a virtual page address for a page 19 in the virtual memory 17 is translated to a physical address 19' for a page in the physical memory 18 using a page table 20. The page table is maintained in memory to provide this translation between virtual address and physical address. Usually a translation buffer 21 seen in FIG. 1 is included in the CPU to hold the most recently used translations so a reference to a table 20 in memory 14 need not be made to obtain the translation before a data reference can be made. Only the pages used by tasks currently executing (and the operating system itself) are likely to be in the physical memory 14 at a given time; a translation to an address 19' is in the page table for only those pages actually present. When the page being referenced by the CPU 10 is found not to be in the physical memory 14, a page fault is executed to initiate a disk read operation in which a page from the physical memory 14 is replaced with the desired page maintained in the disk memory 16, this disk read being under control of the operating system.

The CPU 10 of FIG. 1 may also have internal cache memory, including an instruction cache or I-cache, and a data cache or D-cache, as described in the above mentioned application Ser. No. 547,630, but these are not of concern in the operation of the cache 15 according to this embodiment of the invention. The memory used by the computer system of FIG. 1 is thus hierarchical, with the fastest being the internal caches (I-cache and D-cache, the next fastest being the cache 15, then the main memory 14, and finally the swap space in the disk 16. The difference in speed between the fastest and slowest is many orders of magnitude. The internal caches and the cache 15 are accessed within a few CPU cycles, while the main memory 14 is accessed in perhaps ten to one-hundred or more CPU cycles, and a page swap to disk 16 requires many hundreds or thousands of CPU cycles. The performance of the system therefore is highly dependent upon maintaining in the caches instructions and data that are currently being used. A subset of the data in the physical memory 14 (mapped to 18 of FIG. 2) is in the cache 15 at a given time, and a subset of the data in the cache 15 is in the internal caches I-cache and D-cache. The cache 15 may be of the write-through type, in which a write to the cache 15 by the CPU 10 always includes a write to the corresponding location in memory 14, or of the write-back type, in which a write to the cache 15 renders the cache and memory inconsistent and the memory is not updated until the cache location is displaced or the memory location is referenced by another processor.

Figure 3:
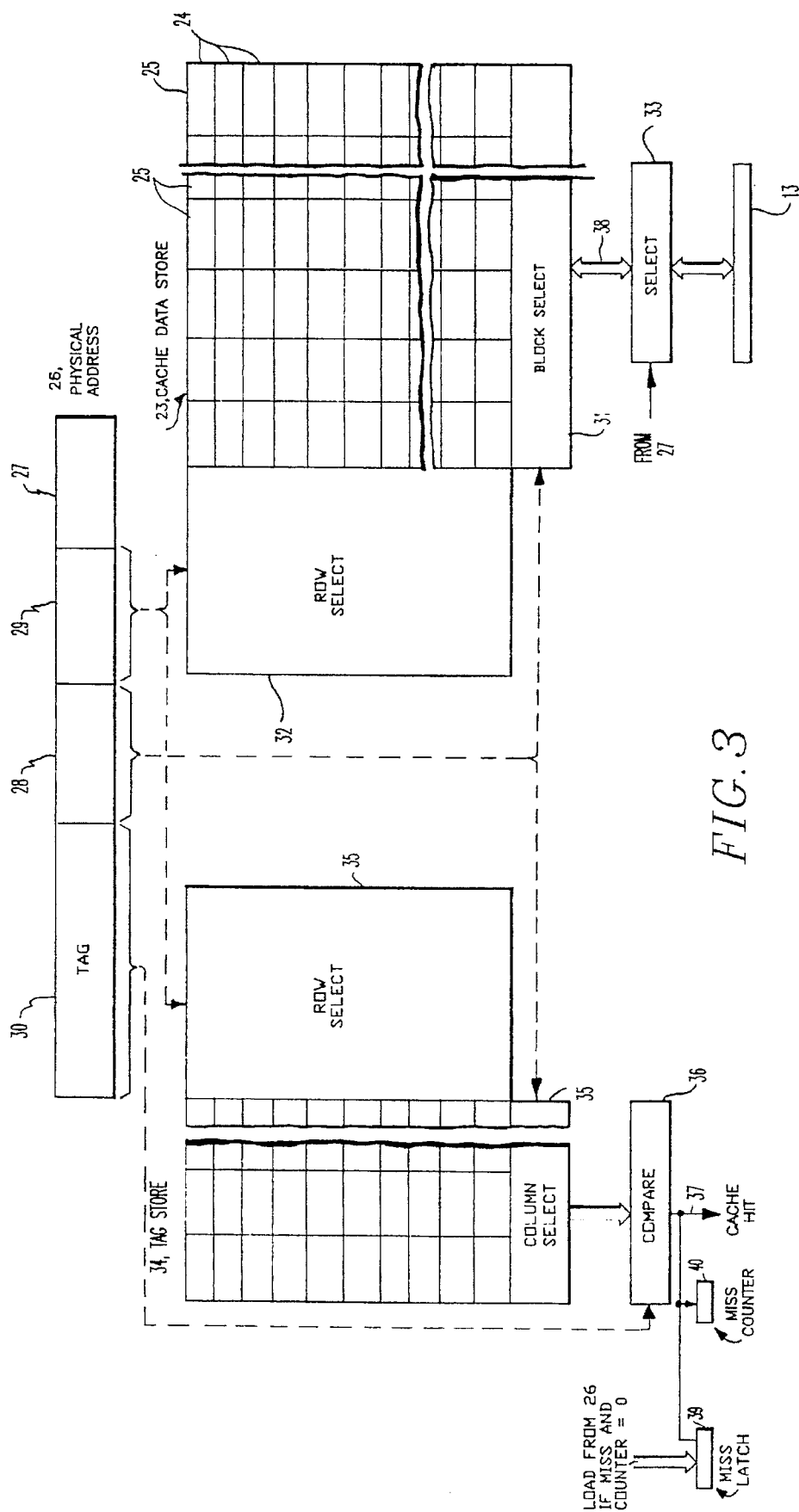
FIG. 3 is an electrical diagram of a cache memory used in the system of FIG. 1, according to the invention.

The cache memory 15 may be of the direct-mapped type, constructed as seen in FIG. 3. The method of the invention may be used in a system having an N-way associative cache, but is perhaps most useful in systems using direct-mapped caches. In FIG. 3, the data is stored in an array of memory chips which may be depicted as an array 23 of rows 24, where each row has a number of blocks 25. Each block 25 contains, for example, 64-bytes or eight quadwords of data. A physical address 26 generated by the CPU and placed on the CPU bus 13 is used to access the cache 15 (or main memory 14); this physical address 26 contains a low-order field 27 which selects the byte (or word) within a block 25, a field 28 which selects the block 25 within a row 24, a field 29 which selects the row, and a tag field 30. The fields 27, 28 and 29 together are referred to as the cache index field. The field 28 is applied to a decoder 31 to make the selection of the block within the row, and the field 29 is applied to a row decoder 32 to select the row for output to the decoder 31. The low-order bits of the address in field 27 are applied to a decoder 33 for selecting the byte or word within a block for coupling to the data bus in the CPU bus 13. In the cache controller 12, a tag store 34 holds a number of tags corresponding to the number of blocks 25, and the fields 28 and 29 from the address 26 on the address bus of the CPU bus 13 are used by row and column decoders 35 to select one of the tags for application to the tag compare circuit 35. The other input to the tag compare circuit 36 is the tag field 30 from the address 26. If the stored tag selected by decoders 35 and the tag field 30 match, a tag hit is signalled by output 37, and the data on output 38 from the data array 23 is used, otherwise a miss is signalled and the data output is discarded. When a miss occurs, a reference to memory 14 must be made and so the address is passed through the cache controller 12 to the system bus 11. Following a cache miss, a cache fill is executed, in which a cache line (e.g., 64-bytes) is read from main memory 14 and written to the location in cache 15 which contains the read address (which may be for a byte or word) that caused the cache miss.

The cache 15 illustrated in FIG. 3 is of the direct-mapped type, in that a first data item having a given value of the address bits in fields 28 and 29 must be stored in one and only one location (in one of the block 25) in the cache array 23. If a memory reference is made to a second memory location having the same value of address bits in fields 28 and 29, this reference will map to the same location as the first data item referred to, and so the first must be written over by the second. For example, if the task executing on the CPU 10 makes alternating references to the same index into two different pages having the same address bits in fields 28 and 29, then the block containing this index from the two pages will be repeatedly overwritten in cache, producing a thrashing condition. In contrast, a set associative cache allows a given address value to be mapped to more than one location in a cache array, so two addresses from different pages having a corresponding set of bits equal can exist in the cache at the same time. The hardware for implementing a direct-mapped cache as seen in FIG. 3 is faster in operation, however, compared to a set associative cache, because only one tag-compare operation is needed, as done in the compare circuit 36. In a set associative cache, the tag address must be compound with a number of possible matches, and then the corresponding data also selected (after the tag compare is completed); this additional step necessarily makes the operation slower.

As a simplified example, assume that the page size in the virtual memory system executing on the computer system of FIG. 1 is 1K-bytes, so the low-order byte addresses (binary) repeat after a 10-bit address value. Also, assume that the configuration of the cache 15 is 2K-bytes such that the cache can contain parts totalling 2K-bytes of the physical memory map 18 of FIG. 2, consisting at any given time of many blocks from different pages, but totalling two pages. A data item with a physical address beginning on a boundary with bits <10:0> zero in the binary address will always map to the first block in the cache 15. Thus physical addresses 0000, 2048, 4096, etc., will map in the same place in the cache, i.e., the fields 28 and 29 include bits <10:4> of the address 26, for example, which are identical. A task that alternately accesses physical locations 0000 and 2048 will therefore always produce a cache miss in the direct-mapped cache 15 of FIG. 3. In contrast, in a two-way associative cache (or one of higher associativity) the two data items can be maintained in cache at the same time so cache hits will be produced by repeated alternate accesses to these two physical addresses. Two or more locations repeatedly missing and displacing each other from a cache is called "thrashing". Thrashing also occurs in an N-way associative cache, since locations are assigned pseudorandomly, but is more prevalent in a direct-mapped cache.

Figure 4:
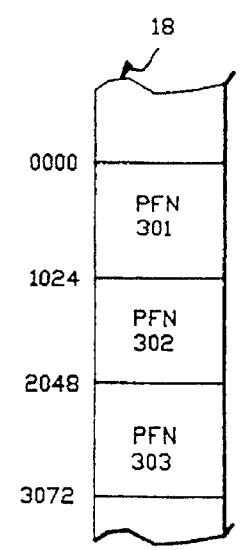
FIG. 4 is a diagram of a part of the main memory map when implementing the page number swapping operation according to one embodiment of the invention.

According to the invention, the cache 15 is large enough to hold a number of pages in the virtual memory management environment executing on the CPU 10, the pages are remapped in physical memory (and in the cache) to eliminate the thrashing condition. In the example, referring to FIG. 4, where the cache 15 holds at least two of the 1K-byte pages, the operating system can remap virtual pages to physical pages in the memory 14 (memory map 18) to give the desired effect of eliminating alternate reference to the same cache location. Virtual addresses 0000 and 2048 are in different virtual address pages, and might be mapped to two physical pages (such as page frame numbers 301 and 303) that map to the same locations in the cache 15. For such mapping, the direct-mapped cache 15 thrashes when repeated accesses are made to the virtual addresses 0000 and 2048. A different virtual-to-physical mapping (such as assigning page frame numbers 301 and 302, instead of 301 and 303) allows both pages to be in the 2K-byte cache 15 at the same time, and the cache gives the effect of a two-way associative cache. The same data that was in PFN 303 is rewritten to PFN 302 in the physical memory 14, thus a pair of blocks which previously mapped to an identical location in the cache 15 now map to different block locations. The sets of address bits of the physical addresses 26 for the two items will now have a bit that is different in the fields 28 and 29.

It is a simple task to copy the data and remap the page frame numbers assigned to virtual pages by the operating system (this function already exists in UNIX or VAX/VMS for remapping bad memory block, i.e., those exhibiting soft errors or the like). First, however, the data items that are causing cache misses (thrashing) must be detected. The existence of these items is of course data-dependent, and applications-software dependent, so prediction before runtime of when the condition will occur is virtually impossible; also, in another invocation of the software, the instances of thrashing will probably occur at different times and places in the program. The software in question must be running before it is known if the condition exists, and before the locality of each instance of the condition is known.

Referring to FIG. 5, one method of detecting the cache miss condition during runtime is to detect on the bus 11 a cache fill (or cache miss) operation. This can be done by logic 40 which detects a bus status or bus command field on the control/command bus 11c of the system bus 11, specifying a cache fill; at the same time, the address of the cache fill is present on the address bus 11a of the system bus. A counter 41 tallies these cache fill operations; this counter is preferably programmable by a write to a register in I/O space so the CPU 10 can vary the sample rate for tuning the cache remapping function. The sampled bus activity is recorded in a buffer 42 when the counter 41 overflows. The bus operation type code and the fill address is thus written to the buffer 42 for the fill address that caused the overflow. When the contents of the buffer 42 reach some selected threshold (number of stored entries), an interrupt to the CPU 10 is generated by a circuit 43, and, after the CPU determines the purpose of the interrupt by inquiry on the system bus, the CPU enters an interrupt routine which reads the contents of the buffer 42 using privileged code at I/O space addresses.

Figure 7:
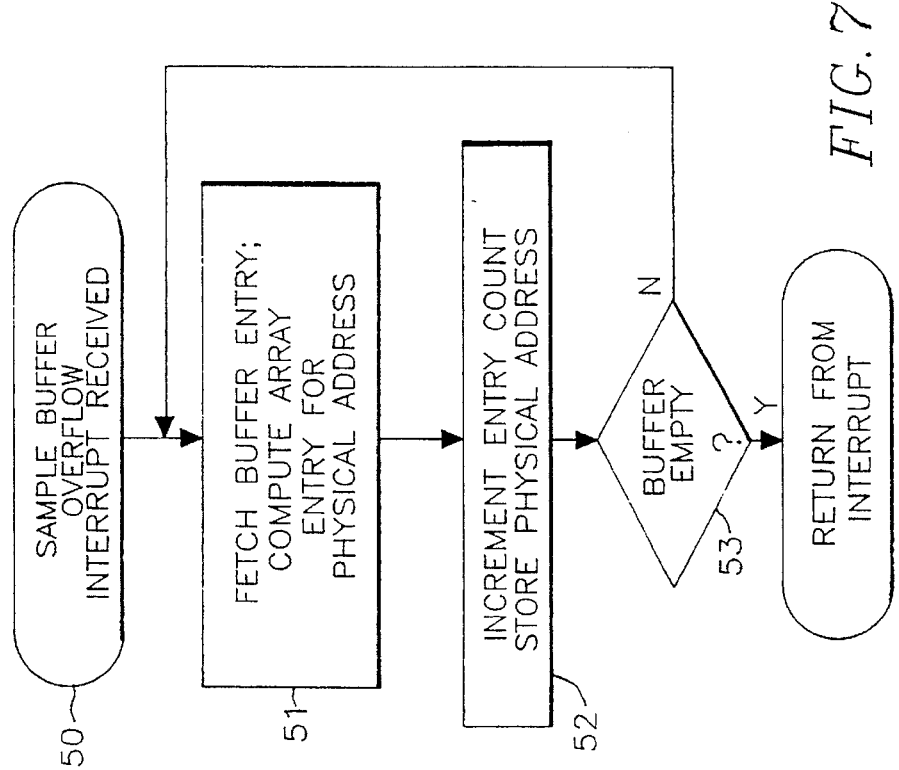

The sample buffer interrupt routine is detailed in flowchart form in FIG. 7. This routine processes the samples from buffer 42 into structure 45 (as shown in FIG. 6) for later use by the cache management routine. Structure 45 consists of an entry 46 for each cache page; in a 128 Kbyte cache using 4 Kbyte pages, there are thirty-two cache pages, while a 16 Mbyte main memory 14 would have 4096 4 Kbyte pages, so many physical memory pages may map to the same cache page. Each entry 46 has a field 47 for the physical page address and a field 48 for a count. For each sample read from the buffer 42, the sample physical page address cache index field is used to select an entry 46 in structure 45. The selected entry's count field 48 is incremented by 1 end the sample physical page address is written into the selected entry's physical page address field 47.

Therefore, field 47 contains the last sampled physical address which maps to this entry 46. These steps are shown in flowchart form in FIG. 7. In FIG. 7, item 50 is the interrupt routine entry point when a sample buffer full interrupt is received. Item 51 is a step of fetching one of the buffer 42 samples and computing the cache index field which selects entry 46. At item 52, the count field 48 of entry 46 is incremented by 1 and the physical address field 47 of entry 46 is overwritten by the sample physical address. Items 51 and 52 continue in a loop until decision point 53 indicates all samples in buffer 42 have been processed, at which time a return from interrupt is executed.

Figure 8:
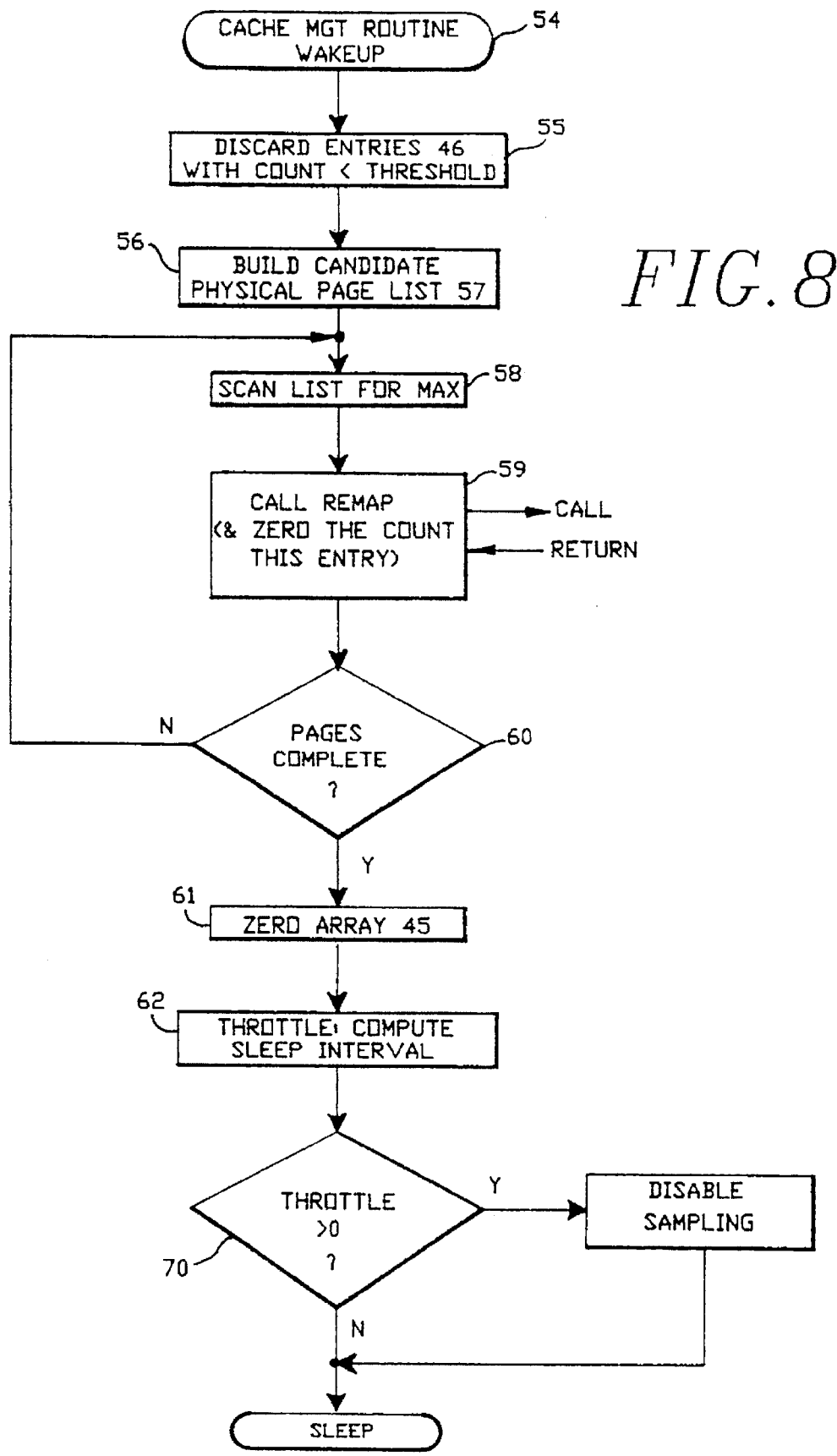
FIG. 7, FIG. 8 and FIG. 10 are logic flow charts of the cache management operation employed in one embodiment, executed on the CPU of FIG. 1.
Figure 9:
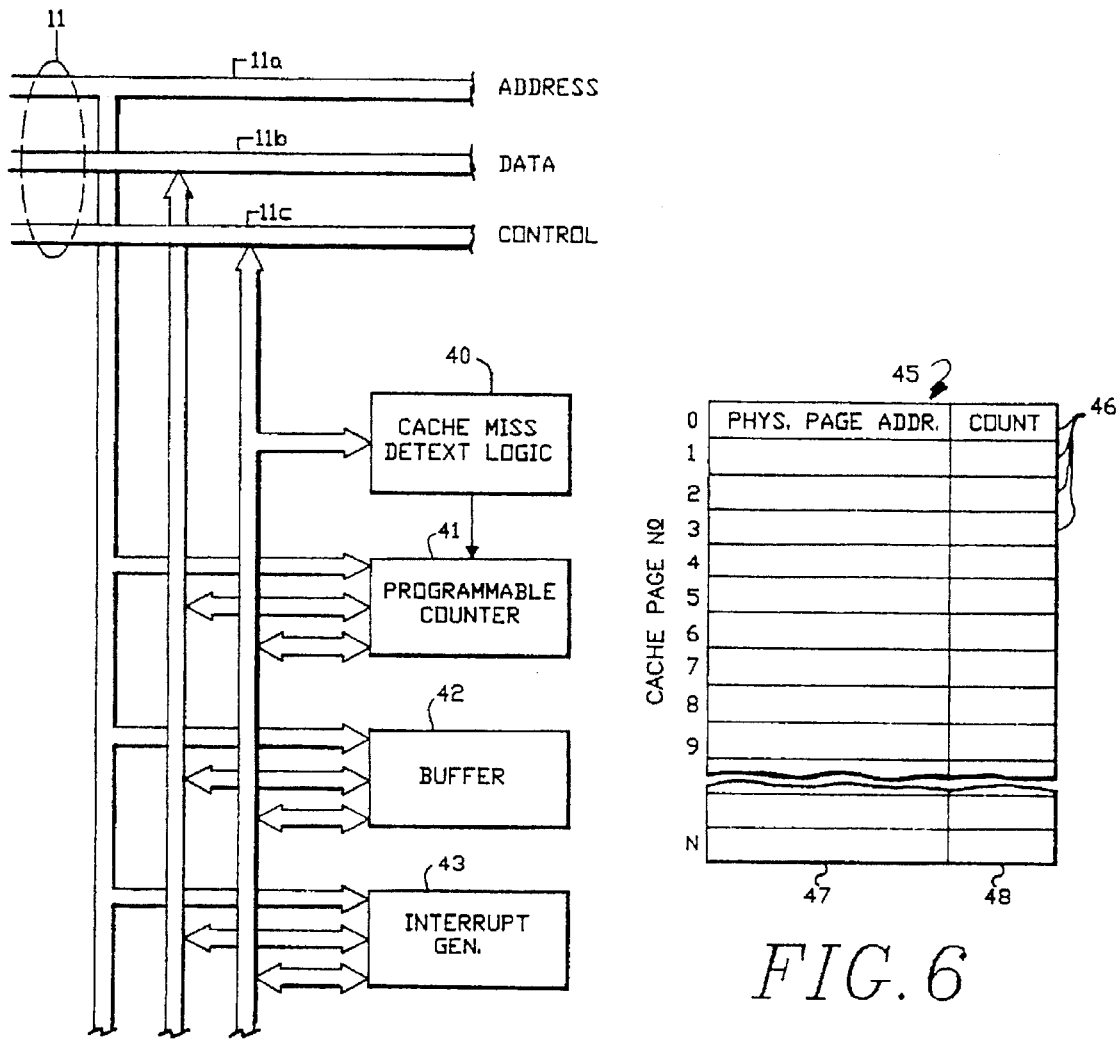
FIG. 9 is a diagram of a page list used in the method of FIG. 7.

At some fixed interval (e.g., every 250-ms), the CPU 10 executes a cache management routine illustrated in flow chart form in FIG. 8. The purpose is to locate which if any cache pages are seeing heavy cache miss traffic, and to find the memory addresses causing this cache miss traffic, then to remap these pages in physical memory so they will map to a different cache page and thus reduce the cache miss rate. In FIG. 8, the cache management routine is started at item 54, as by a timer interrupt (or the throttle routine to be described below). This phase of bus activity sample processing is to determine from the array 45 a subset of cache thrashing physical memory pages to remap during this sample interval. The subset of physical memory pages is determined by first discarding any sample count data structure entries 46 whose sample count field 48 is less than a threshold value, indicated in FIG. 8 by item 55. This threshold sample count value is a function of the overall system cost of remapping a physical memory page compared to the cost of allowing continued cache misses to the group of physical memory pages cache thrashing. A candidate physical memory page list is assembled, indicated by item 56 by scanning the entire sample count data structure 45 and copying elements whose sample count field 48 exceeds the sample count threshold value to a candidate page list 57 of FIG. 9.

The final phase of bus activity sample processing of FIG. 8 is to attempt to remap a number of the cache thrashing pages identified in list 57 by the above processing. The candidate page list 57 is scanned for the element with the largest sample count field 48, indicated by item 58 of FIG. 8, and the remap page routine (part of standard operating system) is called as indicated by item 59. If the physical page thus identified passes a series of tests (such as page not locked, on the free list, or belonging to a currently running, swapping, or exiting process) its current virtual-to-physical memory mappings in page tables 20 are invalidated, the contents of the physical page are copied to a new physical page, and new virtual-to-physical memory mappings page table information created. This remap process is repeated in a loop created by item 60 with the candidate page entry with the next highest sample count field 48 until the desired number of page remaps is accomplished or the list exhausted, then the array 45 is zeroed as indicated by item 61, and the throttle activity of computing the sleep interval is entered at item 62.

The throttle function is implemented to make sure the cache management function does not occupy an inordinately large percentage of the CPU time. The overhead allotted to the cache management function may be, for example, one percent of CPU time. If the cache management routine occupies more than this, it may be inefficient, and performance would be better served by throttling the cache management routine to limit it to this selected overhead. Thus a throttle value is selected to optimize the level of cache management overhead. This throttle value may determined by one or more of several methods. First, a fixed overhead based on actual computed time spent by all cache management processing (interrupt service as well as remapping functions) during the just past cache management cycle (250-ms.) with throttle=function((computed overhead)/(maximum desired overhead))

this being the most direct method to limit overhead to a specific maximum time. Second, a ratio of most-to-least used cache page falls below some value, so throttle=function((greatest count)/(lowest count))

Or, third, the throttle may be invoked if the busiest cache page falls below some absolute value. The throttle becomes an integer value. This value if greater than zero will shut off the cache management sampling, interrupts, and all processing associated with the cache management routine of FIGS. 7 and 8 until that number of cache management intervals (e.g., 250-ms each) expires. At that time, the sampling and sample buffer full interrupt is enabled.

Figure 10:
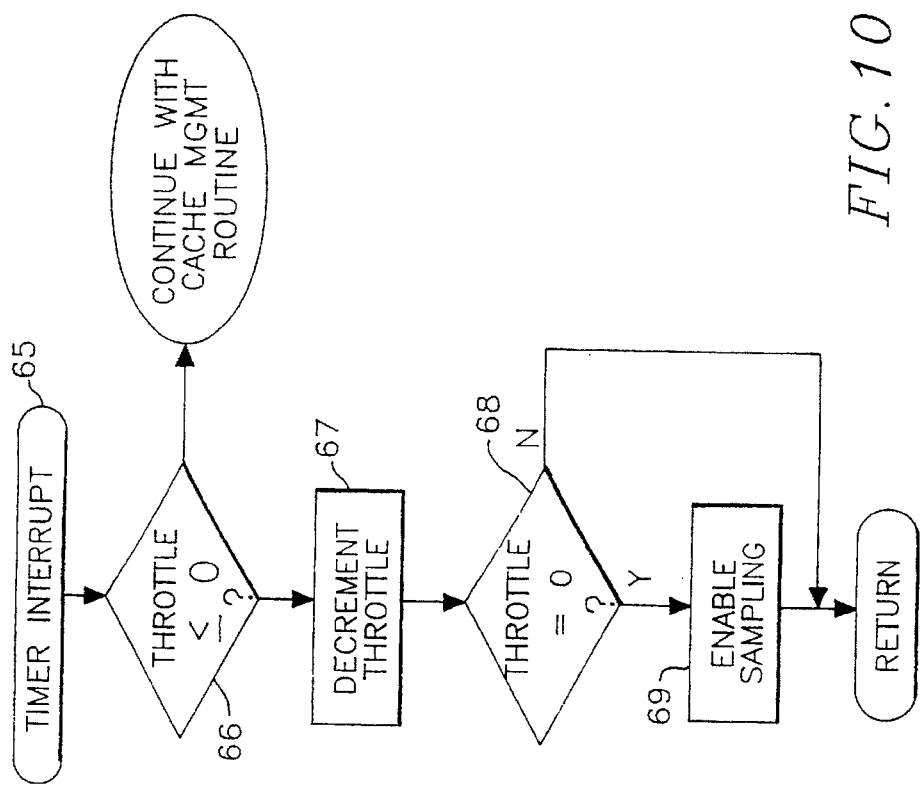

Referring to FIG. 10, implementing this throttle function, when a timer interrupt occurs at 250-ms interval, indicated at item 65, the first event is to check the throttle value to see if it is zero or less at decision point 66. If so, the cache management routine is entered at item 54 of FIG. 8. If not, the throttle is decremented at item 67, and again checked at item 68 to see if the throttle is equal to zero, and if yes, sampling is enabled at item 69. If not, control is returned to the previously executing process (before the interrupt). In FIG. 8, the sleep interval is computed at item 62, and then at item 70 a check is made to see if the throttle is greater than zero, and, if so, sampling and the sample buffer full interrupt is disabled at item 71. In either event, the routine exits to a sleep function at item 72, i.e., control returns to the process activity before this timer interrupt.

An algorithm for remapping the physical pages would be to use one of the "unallocated pages" in physical memory that the operating system keeps track of, i.e., give the page frame to be moved one of the unused page frame numbers, so there is then no displaced page that would have to be switched around. After the new numbers are thus assigned, the method will require moving a page to a new location in the physical memory 14. With a high probability, locations that are actively thrashing will end up being sampled and remapped.

The operations of FIGS. 7, 8 and 10 are added to the operating system of the CPU 10, providing a cache management function. The chief advantage of this enhancement is greater CPU performance due to decreased cache miss rates. This results in a higher cost-performance ratio, the same CPU hardware at virtually the same cost providing faster execution. Lower cache miss rates also reduce the need for system interconnect bandwidth on the bus 11, and may allow a lower cost system interconnect for a given CPU performance. A secondary advantage of an operating system-enhanced CPU cache based system as illustrated is that there will be smaller run-to-run variations in program performance. This is an important feature to users counting on predictable system performance in real-time applications.

A characteristic of the use of the invention is that the speed of execution of a program changes with time after start-up; the performance will improve if the pattern of addressing is such that thrashing would occur due to the phenomenon discussed above. Almost all programs exhibit highly non-random patterns of addressing, due to the prevalence of loops, so most programs exhibit improvement in performance over time when the method of the invention is used.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of operating a computer system, said computer system including a CPU, a cache having a plurality of cache page locations, and a main memory, said method comprising the steps of:
   a) detecting physical addresses of cache misses, wherein said detected physical addresses correspond to said cache page locations;
   b) recording said detected physical addresses in entries in a structure, wherein each of said entries in said structure corresponds to one of said cache page locations, and counting the number of occurrences of cache misses for each cache page location and recording a cache miss location count for each cache page location in said corresponding entries in said structure; and
   c) remapping data, corresponding to physical addresses recorded in said entries, having a cache miss location count greater than a predetermined threshold value, to a different physical address associated with a different cache page location.

2. The method according to claim 1, wherein said CPU is executing a virtual memory system and said cache is accessed via physical addresses and not virtual addresses.

3. The method according to claim 1, wherein said cache is a direct-mapped cache.

4. The method according to claim 1, wherein said cache is an associative cache.

5. The method according to claim 1, wherein said step of detecting includes:
   counting the number of cache misses and producing a detected cache miss count; and
   storing said detected physical addresses in a buffer each time said detected cache miss count reaches a predetermined number.

6. The method according to claim 5, wherein said recording step is executed each time said buffer is filled and operates on said stored physical addresses in said buffer and said recording step further includes the step of clearing said buffer after said stored physical addresses in said buffer are recorded.

7. A computer system, comprising:
   a) a CPU accessing a main memory and a cache, said cache having a plurality of cache page locations, data being stored in said main memory and in said cache page locations in pages;
   b) means for detecting physical addresses for accesses by said CPU producing cache misses, wherein said detected physical addresses correspond to said cache page locations;
   c) means for recording said detected physical address in entries in a structure, wherein each of said entries corresponds to one of said cache page locations, and for counting the number of occurrences of cache misses for each cache page location and recording a cache miss location count for each cache page location in said corresponding entries in said structure; and
   d) means for remapping data, corresponding to physical addresses recorded in said entries having a cache miss location count greater than a predetermined threshold value, to a different physical address corresponding to a different cache page location.

8. The system according to claim 7, wherein said CPU is executing a virtual memory system.

9. The system according to claim 8, wherein said cache is a direct-mapped cache accessed via physical addresses and not virtual addresses.

10. The system according to claim 8, wherein said cache is an associative cache.

11. The system according to claim 10, wherein said detecting means includes:
    means for counting the number of cache misses and for producing a detected cache miss count; and
    means for storing said detected physical addresses in a buffer each time said detected cache miss count reaches a predetermined number.

12. The system according to claim 11, wherein said recording means executes, each time said buffer is filled, on said stored physical addresses in said buffer and includes means for clearing said buffer after said stored physical addresses in said buffer are recorded.

13. The system according to claim 12, including means for interrupting said CPU when said buffer is filled.

14. A method of operating a computer system, comprising the steps of:
    a) storing in a main memory, pages of data used by a task executing on a CPU, where said CPU is using a virtual memory system;
    b) storing in a cache, a subset of said pages of data of said main memory in cache page locations;
    c) generating virtual page addresses in said CPU while executing said task;
    d) translating said virtual page addresses to physical page addresses to access said cache page locations in said cache and said pages in said main memory;
    e) detecting physical addresses of accesses that cause cache misses wherein said detected physical addresses correspond to said cache page locations;
    f) counting the number of cache misses and producing a detected cache miss count;
    g) storing said detected physical addresses in a buffer each time said detected cache miss count reaches a predetermined number;
    h) recording said stored physical addresses in entries in a structure, wherein each of said entries corresponds to one of said cache page locations, and counting the number of occurrences of cache misses for each cache page location and recording a cache miss location count for each cache page location in said corresponding entries in said structure, each time said buffer is filled and clearing said buffer after each of said stored physical addresses are recorded; and
    i) remapping data, corresponding to said physical addresses recorded in said entries, having a cache miss location count greater than a predetermined threshold value, to a different physical address corresponding to a different cache page location.

15. The method according to claim 14, wherein pages of data are swapped between said main memory and a disk memory when pages of data required by said CPU are not currently stored in said main memory.

16. The method according to claim 14, wherein said cache is a direct-mapped cache storing a number of pages.

17. A computer system, comprising:
   a) a CPU executing a virtual memory system;
   b) a main memory storing pages of data used by a task executing on said CPU under said virtual memory system;
   c) a direct-mapped cache storing a subset of said pages of data stored in said main memory in cache page locations;
   d) means for generating virtual page addresses in said CPU while executing said task;
   e) means for translating said virtual page addresses to physical page addresses to access said cache and said main memory;
   f) means for detecting physical addresses for accesses by said CPU that cause cache misses, wherein said detected physical addresses correspond to said cache page locations;
   g) means for counting the number of cache misses and for producing a detected cache miss count;
   h) means for storing said detected physical addresses in a buffer each time said detected cache miss count reaches a predetermined number;
   i) means for recording said detected physical addresses in entries in a structure, wherein each of said entries corresponds to one cache page locations, and for counting the number of occurrences of cache misses for each cache page location and recording a cache miss location count for each cache page location in said corresponding entries in said structure each time said buffer is filled and including means for clearing said buffer after said stored physical addresses in said buffer are recorded; and
   j) means for remapping data, corresponding to said physical addresses recorded in said entries, having a cache miss location count greater than a predetermined threshold value, to a different physical address corresponding to a different cache page location.

18. The system according to claim 17, wherein said pages of data are swapped between said main memory and a disk memory when pages of data required by said CPU are not currently stored in said main memory.

* * * * *